(12) United States Patent
Bahl et al.

(10) Patent No.: US 10,637,797 B2
(45) Date of Patent: Apr. 28, 2020

(54) LATENCY REDUCTION WITH PRE-MOVING OF DISTRIBUTED DATA AND ADAPTIVE ALLOCATING OF COMPUTE OPERATIONS

(71) Applicant: Microsoft Technology Licensing, LLC, Redmond, WA (US)

(72) Inventors: Paramvir Bahl, Bellevue, WA (US); Ganesh Ananthanarayanan, Bellevue, WA (US); Srikanth Kandula, Redmond, WA (US); Peter Bodik, Kirland, WA (US); Qifan Pu, Berkeley, CA (US); Srinivasa Aditya Akella, Middleton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/419,275

(22) Filed: May 22, 2019

(65) Prior Publication Data
US 2019/0273695 A1   Sep. 5, 2019

Related U.S. Application Data

(63) Continuation of application No. 14/948,217, filed on Nov. 20, 2015, now Pat. No. 10,320,708.

(51) Int. Cl.
*H04L 12/911* (2013.01)
*H04L 12/26* (2006.01)
*H04L 12/24* (2006.01)

(52) U.S. Cl.
CPC .......... *H04L 47/823* (2013.01); *H04L 41/147* (2013.01); *H04L 43/0852* (2013.01); *H04L 43/16* (2013.01)

(58) Field of Classification Search
CPC . H04L 47/823; H04L 41/147; H04L 43/0852; H04L 43/16
USPC ......................................................... 709/226
See application file for complete search history.

(56) References Cited

U.S. PATENT DOCUMENTS

| | | | | |
|---|---|---|---|---|
| 2010/0036954 A1* | 2/2010 | Sakata | ................ | H04L 12/6418 709/226 |
| 2010/0076933 A1* | 3/2010 | Hamilton | .............. | G06F 3/0604 707/640 |
| 2010/0095303 A1* | 4/2010 | Archer | .................... | G06F 9/505 718/105 |

\* cited by examiner

*Primary Examiner* — Zi Ye
(74) *Attorney, Agent, or Firm* — Watson Patents, PLC; Vladan M. Vasiljevic

(57) ABSTRACT

Latency in responding to queries directed to geographically distributed data can be reduced by allocating individual steps, of a multi-step compute operation requested by the query, among the geographically distributed computing devices so as to reduce the duration of shuffling of intermediate data among such devices, and, additionally, by pre-moving, prior to the receipt of the query, portions of the distributed data that are input to a first step of the multistep compute operation, to, again, reduce the duration of the exchange of intermediate data. The pre-moving of input data occurring, and the adaptive allocation of intermediate steps, are prioritized for high-value data sets. Additionally, a threshold increase in a quantity of data exchanged across network communications can be established to avoid incurring network communication usage without an attendant gain in latency reduction.

20 Claims, 9 Drawing Sheets

LATENCY REDUCTION WITH PRE-MOVING OF DISTRIBUTED DATA AND ADAPTIVE ALLOCATING OF COMPUTE OPERATIONS

CROSS-REFERENCE TO RELATED APPLICATION

This application is a continuation of U.S. patent application Ser. No. 14/948,217, filed on Nov. 20, 2015 and entitled "LATENCY REDUCTION WITH PRE-MOVING OF DISTRIBUTED DATA AND ADAPTIVE ALLOCATING OF COMPUTE OPERATIONS", the entire specification of which is hereby incorporated by reference.

BACKGROUND

Modern computer networking hardware enables physically separate computing devices to communicate with one another orders of magnitude faster than was possible with prior generations of networking hardware. Consequently, it has become more practical to perform digital data processing at locations remote from the user requesting such processing, or on whose behalf such processing is being performed. Network-based services can provide users with access to computer-implemented functionality over a network without requiring that the user install software for performing such functionality locally on the user's computing device, thereby saving the user financial resources that would otherwise have been expended in purchasing such software, as well as the computing resources of storing and executing such software. Instead, users can simply access such network-based services when they desire to avail themselves of the computer-implemented functionality offered by such services. Network-based services are often supported by geographically distributed sets of computing devices such that data can be spread among such geographically distributed sets of computing devices. When compute operations are to be performed on such geographically distributed data, copying all of the data to a centralized location to perform such compute operations may be inefficient.

SUMMARY

To reduce the latency between when a query, directed to a geographically distributed set of data, is received and when a response to such a query is provided, individual steps, of a multi-step compute operation requested by the query, can be allocated among the geographically distributed computing devices so as to reduce the duration of an exchange of intermediate data among such geographically distributed computing devices, and, additionally, portions of the geographically distributed set of data, which can serve as input to a first step of the multistep compute operation requested by the query, can be pre-moved, prior to the receipt of the query, among the geographically distributed computing devices to, again, reduce the duration of the exchange of intermediate data among the geographically distributed computing devices. The pre-moving of input data, and the adaptive allocation of intermediate steps of a multistep computer operation, can be prioritized for high-value data sets, which can be identified based on anticipated latency improvement gains expected to be achieved, the cost, in terms of quantity of data to be copied across network communications, incurred in obtaining such anticipated latency improvement gains, and a duration of the lag between when the geographically distributed set of data is available and a query directed to such a geographically distributed set of data is received. Additionally, a threshold increase in a quantity of data exchanged across network communications can be established to avoid incurring network communication usage without an attendant gain in latency reduction.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
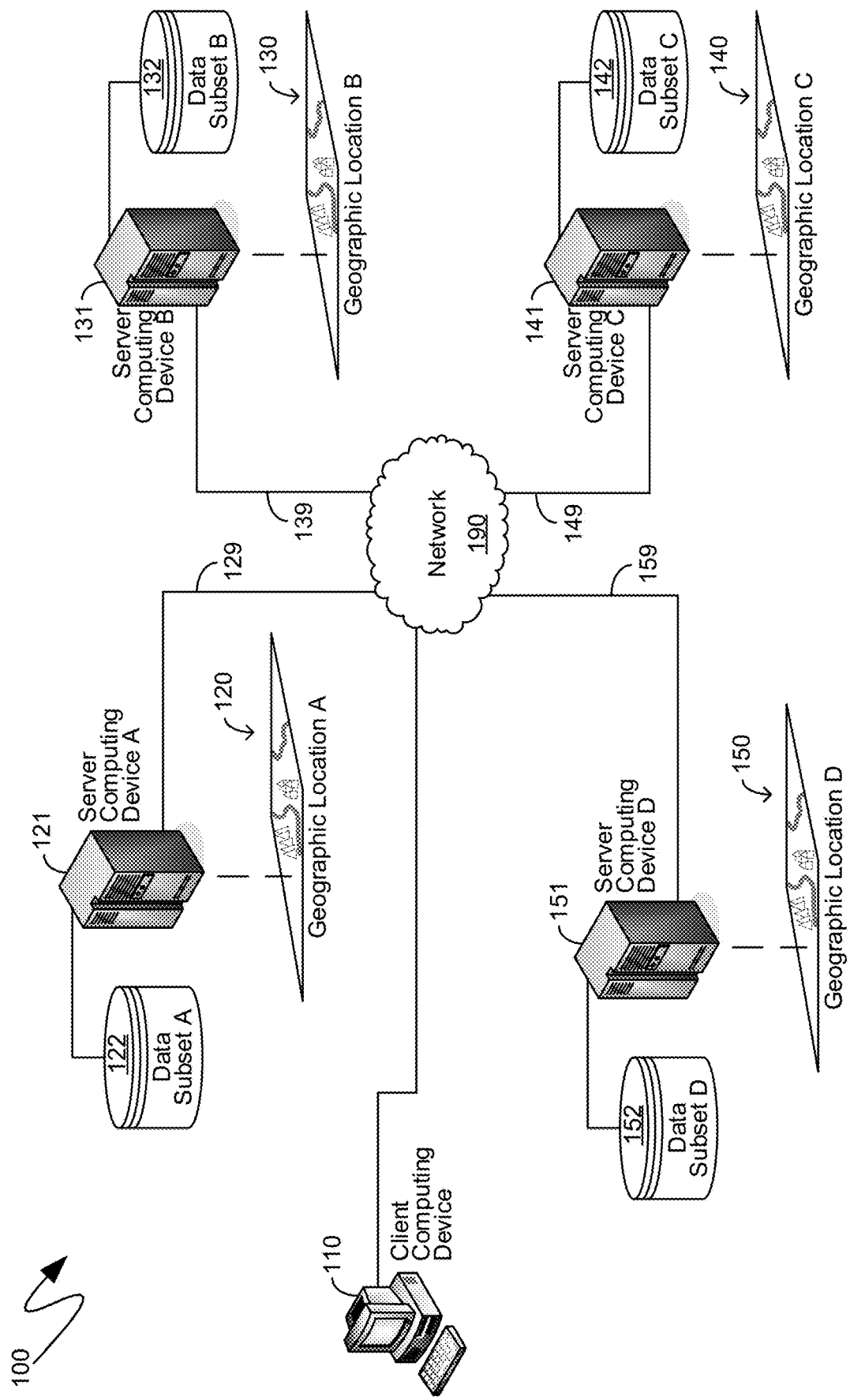
FIG. 1 is a block diagram of an exemplary distributed system.

The following description relates to reducing the latency in responding to queries directed to geographically distributed sets of data. The geographically distributed data can be moved among different geographic locations prior to receipt of the query. Additionally, proportions of intermediate steps performed by computing devices in different geographic locations can be adaptively allocated. The combination of such controls can result in latency reduction, thereby enabling the geographically distributed system to more quickly respond to user queries. Such reduced latency is beneficial to users in that more queries can be submitted and processed within a given period of time and the user is not forced to wait as long to obtain the results to their queries. Additionally, the aforementioned controls are adaptive to real-world scenarios where the communicational capability of computing devices in different geographic locations is not homogenous and is subject to variance, thereby enabling geographically distributed systems to adapt to changing communicational capabilities while continuing to provide fast responses to user queries. As such, the mechanisms described below provide advantages specifically within the context of computer networks and address problems uniquely arising within the context of computer networks and geographically distributed computing systems.

The descriptions below make reference to "bottlenecks" in network communications or "constrained capabilities". As utilized herein, the term "bottleneck" means one or more computer network communication links having reduced communicationally functionality, such as reduced throughput, reduced bandwidth, increased congestion, or other like reduced communicational functionality, as compared with the communication functionality of other links within the geographically distributed computing system. Similarly, as utilized herein, the term "constrained" as applied to network communication functionality or capability means that the ability to transmit data through such a computer network communicational link is less than the ability to transmit data through other computer network communicational links within the same geographically distributed computing system. By way of concrete, empirical examples, the terms "bottleneck" and "constrained", as defined above, refer to reductions greater than 25%, greater than 50%, greater than 80%, greater than 90%, greater than 99% and the like.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary system 100 is illustrated, providing context for the descriptions below. The exemplary system 100 of FIG. 1 is shown as comprising a client computing device 110 that is communicationally coupled to a network 190 to which are also coupled server computing devices 121, 131, 141 and 151, exemplarily comprising a geographically distributed system. For example, exemplary server computing device 121 is illustrated as being physically located within a geographic location 120, exemplary server computing device 131 is illustrated as being physically located within a geographic location 130, which differs from the geographic location 120, and, similarly, the exemplary server computing devices 141 and 151 are illustrated as being physically located within the geographic locations 140 and 150, respectively, which are different from the other geographic locations illustrated in FIG. 1. Additionally, each of the server computing devices 121, 131, 141 and 151 can be communicationally coupled to a local portion of a geographically distributed set of data, exemplarily comprising the data subset 122, local to the server computing device 121, the data subset 132, local to the server computing device 131, the data subset 142, local to the server computing device 141, and the data subset 152 local to the server computing device 151.

The geographically distributed data can be generated by any process that is homogenous as across multiple different, geographically distributed server computing devices. For example, the server computing devices 121, 131, 141 and 151 can implement a video teleconferencing service where users' network communications can be routed to any one of the exemplary server computing devices 121, 131, 141 and 151 equally without change in the service provided to the users. In such an instance, logs of users' interactions with the video teleconferencing service would be locally generated at whichever one of the exemplary server computing devices 121, 131, 141 or 151 the users were communicationally coupled with. Thus, for example, one user, upon accessing the video teleconferencing service, can end up establishing a communicational connection with the exemplary server computing device 121 because, for example, the exemplary server computing device 121 is geographically closest to such a user, or, as another example, because the exemplary server computing device 121 has the greatest processing capability available at the time that the user accesses the video teleconferencing service. Such a user, communicationally coupled to the exemplary server computing device 121, can perform actions through the video teleconferencing service that can be logged in the log file generated locally at the server computing device 121, such as, for example, the data subset 122.

Another, different user can, for example, upon accessing the video teleconferencing service, end up establishing a communication connection with the exemplary server computing device 131. As will be recognized by those skilled in the art, such a user can be agnostic as to which server computing device they are communicating with, since each of the exemplary server computing devices 121, 131, 141 or 151 can equally provide access to the exemplary video teleconferencing service. Nevertheless, such a different user, communicationally coupled with the exemplary server computing device 131, can have their actions logged in a log file that can be generated locally at the server computing device 131, such as, for example, the data subset 132.

Should an administrator of such an exemplary video teleconferencing service seek to obtain information regarding the performance of such a service, for example, if the administrator sought to obtain the average duration spent by each user using the exemplary video teleconferencing service, each of the subsets of data, geographically distributed, such as the exemplary subsets 122, 132, 142 and 152, may need to be processed, as any one user's data can have certain interactions between such a user and the service be logged in any one of the exemplary subsets 122, 132, 142 and 152. As will be recognized by those skilled in the art, the example provided herein can lend itself to the well known Map Reduce algorithm, whereby processes executing on the server computing devices 121, 131, 141 and 151 can first process their local data, and generate therefrom intermediate data, which can then be exchanged in an all-to-all manner among the server computing devices 121, 131, 141 and 151. For example, processes executing on the exemplary server computing device 121 can process the data subset 122 to extract all entries relating to a first user, all entries relating to a second user, all entries relating to a third user, and so on. In a similar manner, processes executing on the exemplary server computing device 131 can process the data subset 132 to extract all entries relating to that same first user, all entries relating to that same second user, all entries relating to that same third user, and so on. The extraction of such entries can comprise the generation of intermediate data, which can then be utilized during a subsequent step. In the specific example of the Map Reduce algorithm, such a subsequent step is, as will be recognized by those skilled in the art, the Reduce step.

More specifically, and returning to the above example, processes executing on the server computing device 121 can, for example, be tasked to collect all of the entries relating to the first user and average a relevant value from such entries, such as, for example, a value corresponding with the duration that the first user spent during any one video teleconference in which such a first user participated. As will be recognized by those skilled in the art, in order to collect all of the entries relating to the first user, processes executing on the server computing device 121 can obtain, from each of the other server computing devices, such as the exemplary server computing devices 131, 141 and 151, entries corresponding to the first user that were extracted from the local data subsets, namely the data subsets 132, 142 and 152, respectively, by those other server computing devices. In a similar manner, processes executing on a server computing device 131 can, for example, be tasked collect all the entries relating to the second user. As can be seen, during the Reduce phase of the Map Reduce algorithm, each computing device can receive a portion of the intermediate data from each of the other computing devices. Such an exchange is known as an "all-to-all" data exchange. The term "data exchange" as utilized herein, therefore, means the independent transmission of data from multiple source computing devices, of a set of computing devices, to multiple destination computing devices, in the same set of computing devices, where a single computing device can be both a source computing device initiating a transmission of data as well as a destination computing device receiving data.

Although illustrated within the context of the Map Reduce algorithm, the descriptions provided herein are equally applicable to any multi-step compute operation where one step consumes input data and generates therefrom intermediate data that is consumed as input to a subsequent step of such a multi-step compute operation. Multiple steps can generate output in parallel that is consumed by a single subsequent step. For example, the descriptions provided herein are applicable to a multi-step compute operation where the output of one step, generated and stored locally on each of multiple ones of the geographically distributed computing devices, and the output of another step, performed concurrently, and also generated and stored locally on each of multiple ones of the geographically distributed computing devices is merged or otherwise utilized together as input to a subsequent step. Such utilization of output of one or more prior steps, performed in series or in parallel, can include the exchange, such as in an all-to-all exchange, among the geographically distributed computing devices as part of establishing the input to a subsequent step of a multi-step compute operation. Such steps can include the well-known Join operation, including hash and broadcast Join operation. The merging, in parallel, of multiple databases is another example of a multi-step compute operation whose latency can be reduced utilizing the mechanisms described herein.

Figure 2A:
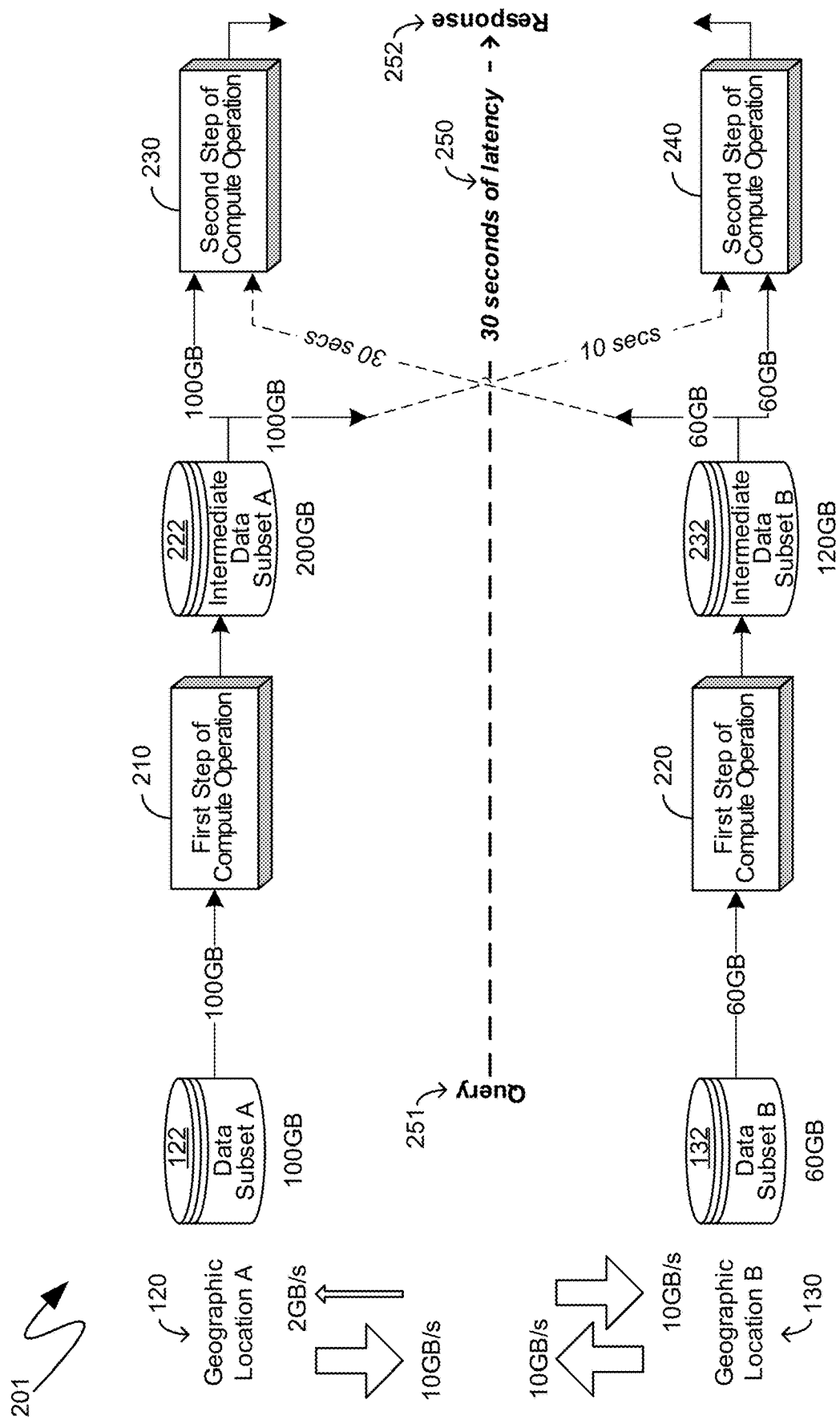
FIGS. 2a through 2d are block diagrams of exemplary exchanges of distributed data in responding to a query.

Turning to FIG. 2a, the exemplary system 201 illustrates an exemplary operation of a distributed computing system having to geographic locations, namely the exemplary geographic locations 120 and 130 that were first illustrated in FIG. 1. For purposes of providing a specific context, and thereby providing a more clear description, geographic location 120 is illustrated in the exemplary system 201, as having a data upload communicational capability of 10 GB/s, but having a data download communicational capability of only 2 GB/s. Conversely, the geographic location 130 is illustrated in the exemplary system 201 as having 10 GB/s of communication capability for both uploading and downloading data. Additionally, each of the geographic locations 120 and 130 is illustrated as comprising data subsets, namely the exemplary data subset 122 and the exemplary data subset 132, the former of which is illustrated as being 100 GB in size, while the latter of which is illustrated as being only 60 GB in size.

Computing devices at each of the exemplary geographic locations 120 and 130 can execute a first step of the compute operation requested by a query, such as that described above. For example, computing devices at the geographic location 120, such as the exemplary server computing device 121 (shown in FIG. 1), can execute the first step of the compute operation 210, while computing devices at the geographic location 130, such as exemplary server computing device 131 (shown in FIG. 1), can execute the first step of the compute operation 220. Different identification numerals are utilized to signify the difference between the execution of the first step of the compute operation in the geographic location 120 and the execution of the first step of the compute operation in the geographic location 140. In each instance, execution of the first step of the compute operation can result in the generation of intermediate data. For example, the execution of the first step of the compute operation 210, at the geographic location 120, can consume the data subset 122, being 100 GB in size, and can generate an intermediate data subset 222, being, exemplarily, 200 GB in size. In a similar manner, the execution of the first step of the compute operation 220, at the geographic location 130, can consume the data subset 132, being 60 GB in size, and can generate an intermediate data subset 232, being, exemplarily, 120 GB in size.

In the exemplary system 201, shown in FIG. 2a, a second step of the compute operation can be equally divided between computing devices at the geographic location 120 and computing devices at the geographic location 130. For example, returning to the above example of a compute operation directed to finding an average length of time that each individual user spent on a video teleconference, computing devices at the geographic location 120 can have been assigned to find the average length of time for half of the individual users of the video teleconferencing service, while the computing devices at the geographic location 130 can have been assigned to find the average length of time for the other half of the individual users of the video teleconferencing service. In such an example, which represents a common division of a step of a compute operation across multiple, geographically distributed computing devices, half of the intermediate data subset 222 can be consumed by the second step of the compute operation 230 being executed by computing devices at the geographic location 120, while the other half of the intermediate data subset 222 can be consumed by the second step of the compute operation 240 being executed by computing devices at the geographic location 130. Similarly, half of the intermediate data subset 232 can be consumed by the second step of the computer operation 240 being executed by computing devices at the geographic location 130, while the other half of the intermediate data subset 232 can be consumed by the second step of the compute operation 230 being executed by the computing devices of the geographic location 120. As can be seen, if the intermediate data subset 222 is 200 GB in size, then 100 GB can be transmitted from the geographic location 120 to the geographic location 130 in order to be consumed by the second step of the computer operation 240. Similarly, if the intermediate data subset 232 is 120 GB in size, then 60 GB can be transmitted from the geographic location 130 to the geographic location 120 in order to be consumed by the second step of the computer operation 230.

Within the exemplary system 201, the network communicational connection of the geographic location 120 can transmit data at 10 GB/s, while it can only receive data at 2 GB/s. By contrast, in the example illustrated by the exemplary system 201, network communicational connection of the geographic location 130 can transmit and receive data at 10 GB/s. As can be seen, therefore, the geographic location 120 can comprise a bottleneck in its ability to receive data. Consequently, continuing with the example illustrated in FIG. 2a, the 100 GB of the intermediate data subset 222 that is transmitted from the geographic location 120 to the geographic location 130 can be transmitted in approximately ten seconds. Conversely, the 60 GB of the intermediate data subset 232 that is transmitted from the geographic location 130 to the geographic location 120 can be transmitted in approximately thirty seconds. Assuming that the processing performed to execute the first and second steps of the multi-step compute operation has a de minimis duration time, the latency 250 between when the query 251 is received, and when the response 252 is provided, can be determined primarily by the length of time taken to exchange portions of the intermediate data subsets, such as exemplary intermediate data subsets 222 and 232. In the example illustrated in FIG. 2a, the latency 250 can be approximately thirty seconds, due to the 2 GB/s bottleneck, at the geographic location 120, in receiving the 60 GB portion of the intermediate data subset 232. More particularly, the exchange of the intermediate data 222 and 232 can be considered to have completed only upon completion of the slowest of the transfers of portions of such intermediate data to other computing devices. Thus, in the simple example illustrated by the system 201 of FIG. 2a, the transfer of intermediate data 222 and 232 is not considered to have completed until the slowest transfer, namely the transfer of 60 GB of data from the intermediate data subset 232 to the computing devices at the geographic location 120, which is illustrated as taking thirty seconds, has completed.

Figure 2B:
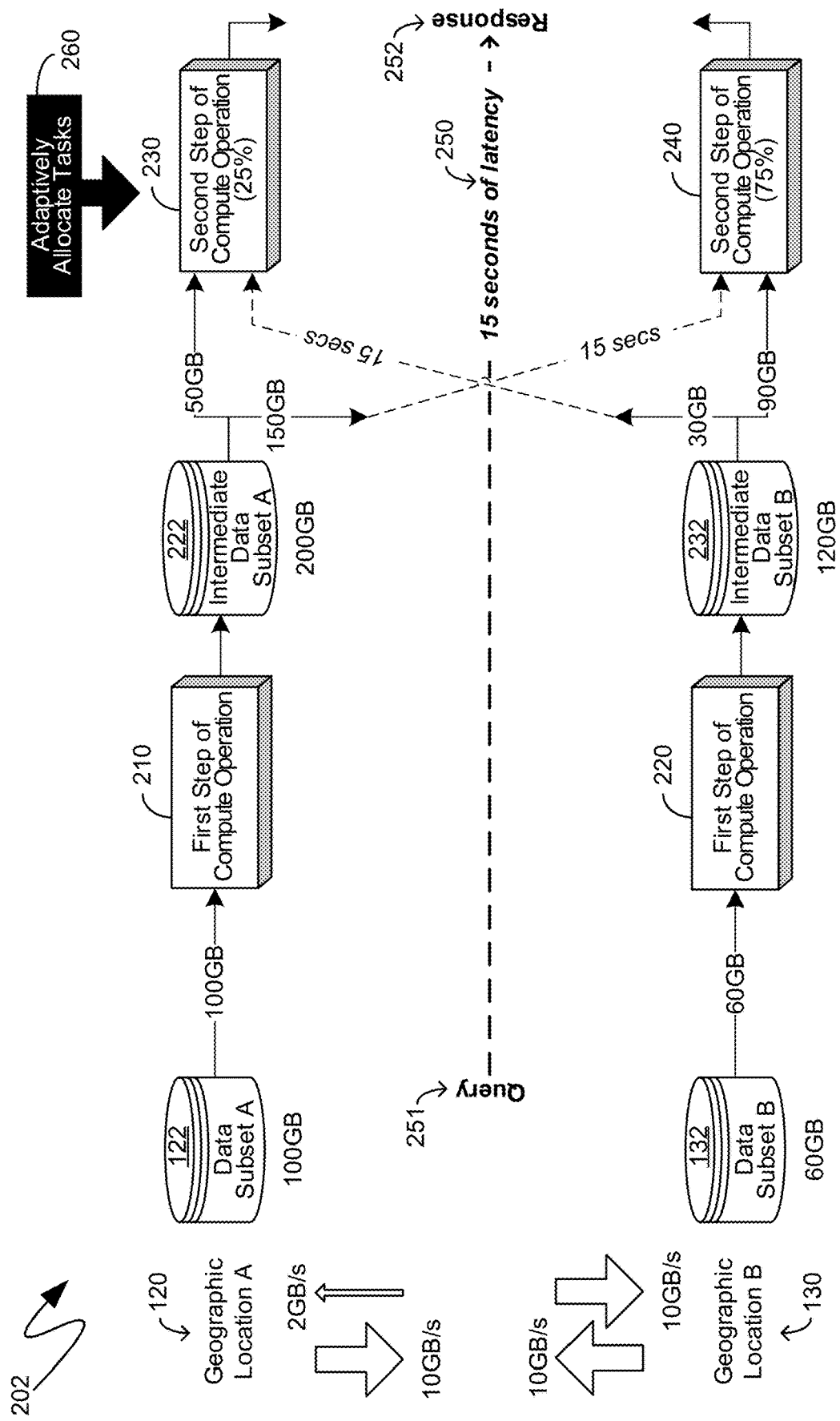

Turning to FIG. 2b, the exemplary system 202 shown therein illustrates one mechanism that can be utilized to reduce the latency 250. More specifically, intermediate steps of the multi-step compute process, such as the exemplary second step of the compute operation illustrated above, can be adaptively allocated as between the computing devices of the geographic location 120 and the computing devices of the geographic location 130. For example, as illustrated by the adaptively allocate tasks action 260, the second step of the compute operation 230, performed by computing devices of the geographic location 120, can be allocated only 25% of the overall second step. By way of a specific example, and returning to the above example of a query directed to finding an average length of time that and individual user spent on a video teleconference provided by the video teleconferencing service, such an allocation can signify that the computing devices at the geographic location 120 can be tasked to find such averages for 25% of all of the users of the video teleconferencing system. The adaptively allocate tasks action 260 can, as illustrated by the system 202, allocate 75% of the second step of the compute operation to be performed by the computing devices at the geographic location 130.

As can be seen from the exemplary system 202, such an adaptive allocation of the processing of an intermediate step of a multi-step compute operation, such as the exemplary second step shown in FIG. 2b, can result in different quantities of data, and different proportions of the intermediate data subsets 222 and 232, being exchanged between the computing devices of the geographic location 120 and the computing devices of the geographic location 130. More specifically, because the second step of the compute operation 230, being performed at the geographic location 120, has been allocated, by the adaptively allocate tasks action 260, to perform only 25% of the second step, only 30 GB of the 120 GB intermediate data subset 232 can be transmitted from the geographic location 130 to the geographic location 120. By contrast, because the second step of the compute operation 240, being performed at the geographic location 130, has been allocated, by the adaptively allocate tasks action 260, to perform 75% of the second step, 150 GB of the 200 GB intermediate data subset 222 can be transmitted from the geographic location 120 to the geographic location 130. Because of the constraint that the geographic location 120 can only receive data at 2 GB/s, while it can transmit data at 10 GB/s and the geographic location 130 can transmit and receive data at 10 GB/s, the transmission of the 150 GB of the intermediate dataset 222, from the geographic location 120 to the geographic location 130, can take approximately fifteen seconds, while the transmission of the 30 GB of the intermediate data set 232, from the geographic location 130 to the geographic location 120, can also take approximately fifteen seconds. Again, as indicated, the transfer of intermediate data can be considered to have completed only when the slowest of the individual transfers completes. In the instant example, illustrated by the exemplary system 202 of FIG. 2b, both transfers complete in approximately fifteen seconds. Consequently, the latency 250 can be reduced from the thirty seconds illustrated in FIG. 2a to fifteen seconds, as illustrated in FIG. 2b.

As can be seen, therefore, adaptively allocating intermediate tasks, such as the second step of the compute operation, as among computing devices at different geographic locations, can result in a reduction in latency. More specifically, adaptively allocating intermediate tasks can enable those intermediate tasks to be disproportionately moved away from computing devices that have a constrained network communicational ability to receive data, and can enable those intermediate tasks to be disproportionately moved to computing devices that have a constrained network communicational ability to transmit data. The adaptive allocation of the proportion of such intermediate tasks that are executed at a geographic location can enable control over the quantities of data transmitted across defined network communication channels, such as network channels having constrained network communicationally ability, thereby resulting in reduced latency, as demonstrated.

Figure 2C:
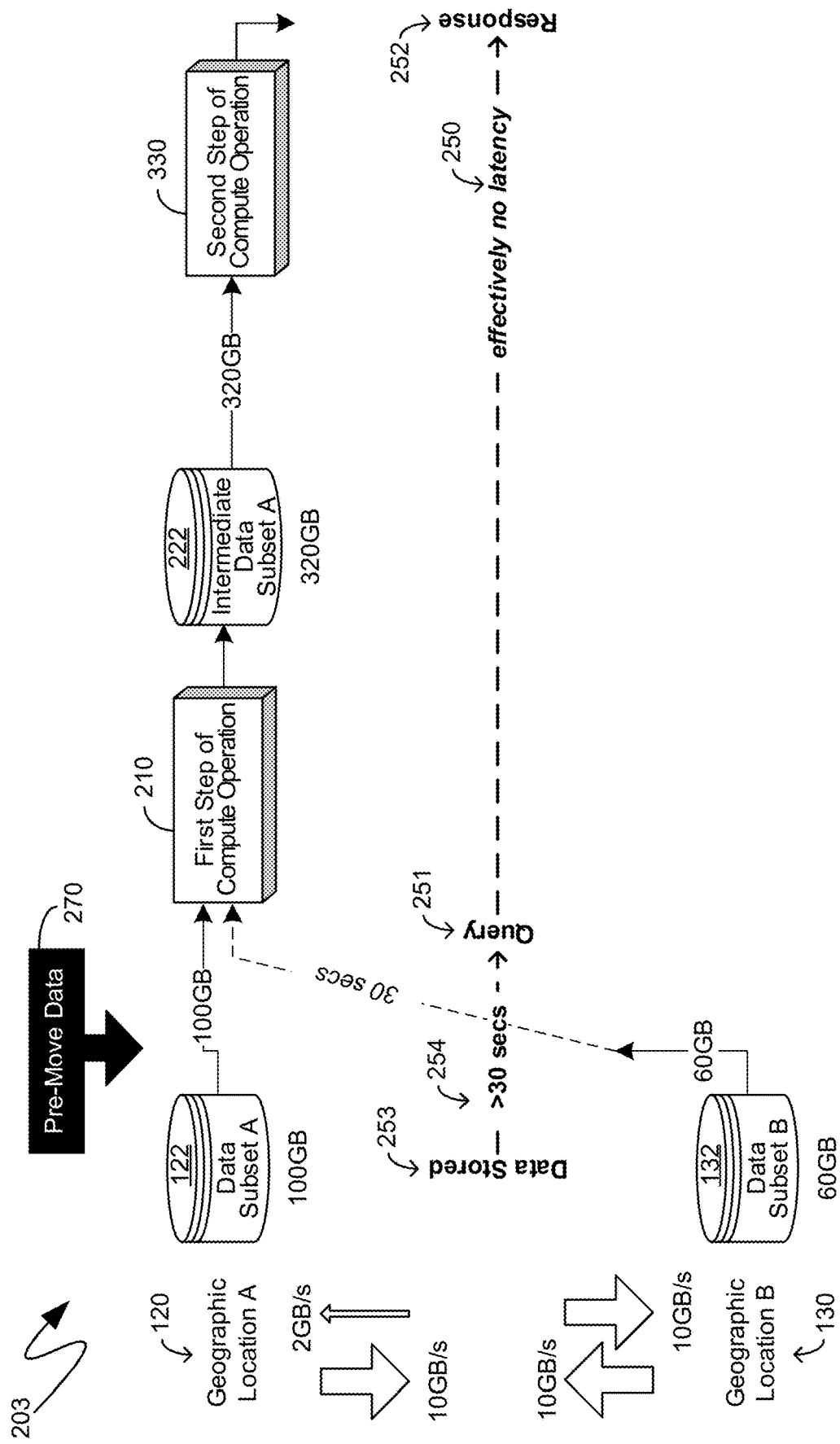

Another mechanism by which the quantities of data transmitted across defined network communication channels, again, such as network channels having constrained communicational ability, can be movement of the initial data prior to receipt of the query 251 such that the data is already in a more convenient location by the time the query 251 is received. More specifically, and with reference to exemplary system 203 shown in FIG. 2c, the exemplary system 203 can comprise the same geographic locations 120 and 130, having the same network communicational capabilities, as in the prior figures. Consequently, as described above, the constrained network communicational ability of the geographic location 120 to only receive data at 2 GB/s can be a bottleneck that can increase the latency 250 between when the query 251 is received, and when a corresponding response 252 is provided thereto. In the exemplary system 203, shown in FIG. 2*c*, the data to which the query 251 can be directed can be stored, or created, at a time 253 prior to the receipt of the query 251. If the query 251 can be anticipated, the lag 254 between the completion of the data creation or storage at time 253 and the receipt of the query 251 can be utilized to place such data in a more advantageous location. For example, within the exemplary system 203, some or all of the data subset 132 can be moved from the geographic location 130 to the geographic location 120. More specifically, because the transfer of data to the geographic location 120 can be a limiting factor in reducing the latency 250, moving data to the geographic location 120 before the query 251 is even received can reduce the effect, on the latency 250, of the constrained ability of the geographic location 120 to receive data.

In many instances, the query 251 can be part of a scheduled, periodic, or otherwise predictable sequence of queries, and can, thereby, be predicted. For example, and with reference to the specific example introduced previously regarding an administrator of a video teleconferencing service who seeks to obtain data regarding the average duration that the customers of such a video teleconferencing service spend on such a service, the administrator may seek to obtain such information on a periodic basis, such as once each day, or once each week. As another example, automated processes may execute at defined times to issue queries, such as the exemplary query 251. In such instances, prior occurrences of a query at a defined time, with a defined periodicity, or other like regularity can be utilized to predict a subsequent arrival of a query, such as the exemplary query 251. When the arrival of a query, such as the exemplary query 251, can be predicted in advance, the period of time between when the data, to which such a query 251 would be directed, such as the exemplary data subsets 122 and 132, is stored or created, and when the query 251 is received, can be a lag 254 that can be utilized to pre-move data, such as is illustrated by the exemplary pre-move data action 270. Such a pre-move of data can reduce the latency 250 in responding to the query 251, once the query 251 is actually received.

The simplified example of the exemplary system 203 illustrates that, should the lag 254 be of sufficient duration, such as, in the present example, should the lag 254 be greater than thirty seconds, all of the data of the data subset 132 can be moved from the geographic location 130 to the geographic location 120. In such an instance, the processing of the multi-step compute operation requested by the query 251 can occur exclusively at the geographic location 120. As indicated previously, the duration of the processing of, for example, the first step of the computer operation 210 and the second step of the computer operation 230 can be of a much smaller duration than the copying or moving of data between geographic locations. Consequently, for illustrative purposes, if all of the data of the data subset 132 is pre-moved to the geographic location 120, the latency 250 in responding to the query 251, with the response 252, can be negligibly small.

Figure 2D:
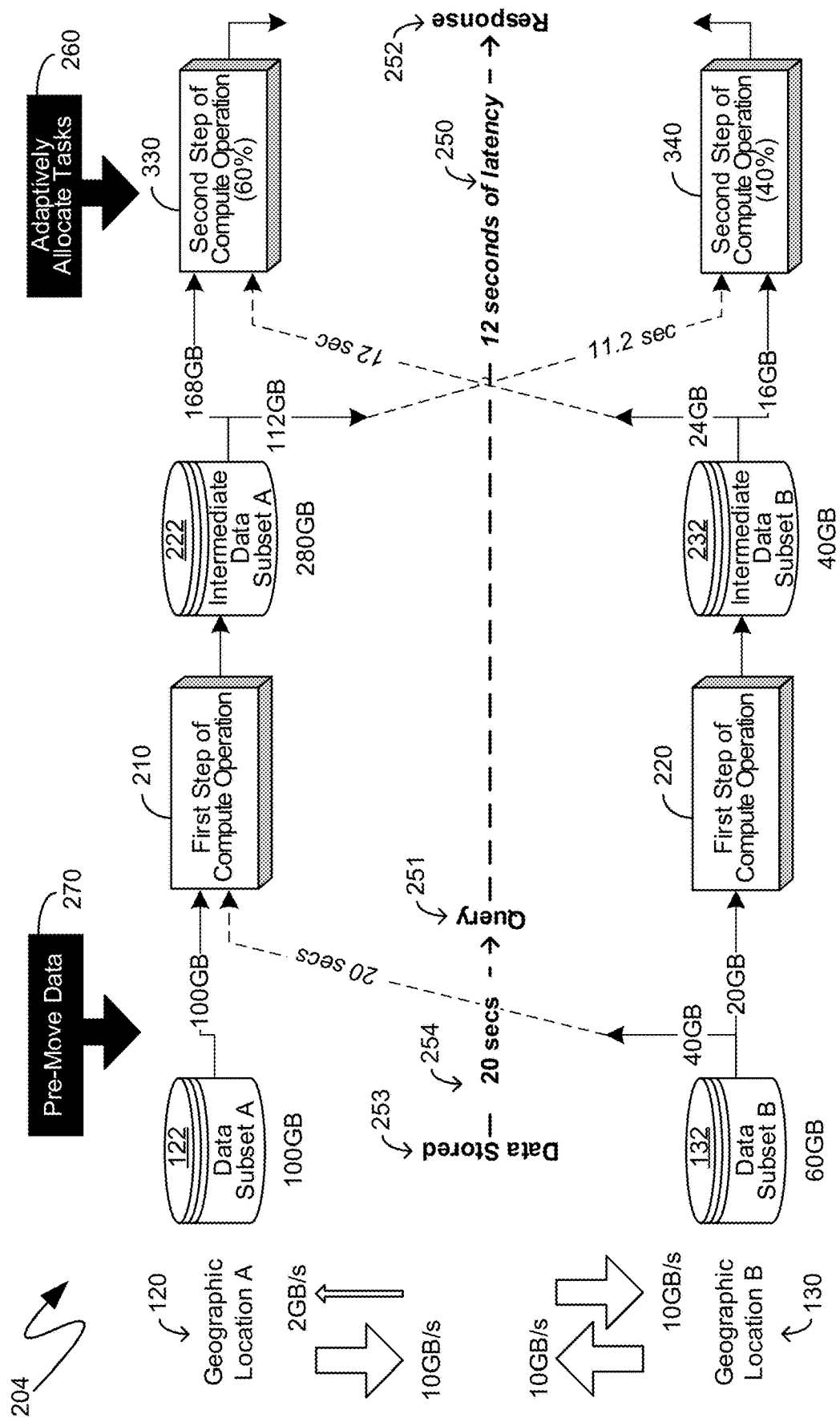

In many instances, however, it can be impractical to transfer all of the data from one geographic location to another. For example, the lag 254 may not be of sufficient duration to achieve such a transfer. As another example, such a transfer may be disadvantageous for other, subsequent queries, or may disadvantageously consume too much network capacity. Turning to FIG. 2*d*, the symbiotic combination of the pre-move data action 270 and the adaptively allocate tasks action 260 are illustrated within the context of the exemplary system 204. More specifically, and as illustrated in FIG. 2*d*, a pre-move data action 270 can be utilized in conjunction with the adaptively allocate tasks action 260 to further reduce latency 250 beyond the reduction achieved only by the adaptively allocate tasks action 260, such as that exemplarily described above and shown in FIG. 2*b*. Unlike in FIG. 2*c*, the lag 254 in FIG. 2*d* is only twenty seconds, which, nevertheless, allows for 40 GB of the 60 GB data subset 132 to be transferred from the geographic location 130 to the geographic location 120. Upon completion of the first step of the computer operation 210, by the computing devices at the geographic location 120, the intermediate data subset 222 can be 280 GB in size. Conversely, after completing execution of the first step 220, the computing devices at the geographic location 130 can have generated an intermediate data subset 232 of only 40 GB in size.

Given the intermediate data subsets 222 and 232, of 280 GB and 40 GB, respectively, the adaptively allocate tasks action 260 can identify a proportion of the second step, of the multi-step compute operation requested by the query 251, that the computing devices at each of the geographic locations 120 and 130 will perform. For example, balancing the duration of a transfer of a portion of the intermediate data subset 232, from the geographic location 130 to the geographic location 120, with a duration of a transfer of a portion of the intermediate data set 222, from the geographic location 120 to the geographic location 130, the adaptively allocate tasks action 260 can adaptively allocate 60% of the second step of the computer operation 330 to the computing devices at the geographic location 120, and the remaining 40% of the second step of the computer operation 340 to the computing devices at the geographic location 130. Such an allocation, as illustrated by the exemplary system 204 of FIG. 2*d*, can result in 112 GB of the 280 GB intermediate data subset 222 being transmitted from the geographic location 120 to the geographic location 130 and can also, correspondingly, result in 24 GB of the 40 GB intermediate data subset 232 being transmitted from the geographic location 130 to the geographic location 120.

Because the geographic location 120 can transmit data at 10 GB/s, and the geographic location 130 can, likewise, receive data at 10 GB/s, the transmission of the 112 GB portion of the intermediate data subset 222, from the geographic location 120 to the geographic location 130 can be a little greater than eleven seconds in duration, as illustrated in FIG. 2*d*. Additionally, because the geographic location 120 can only receive data at 2 GB/s, even though the geographic location 130 can transmit data at 10 GB/s, the transmission of the 24 GB portion of the intermediate data subset 232, from the geographic location 130 to the geographic location 120, can be twelve seconds in duration. As can be seen, therefore, the adaptively allocate tasks action 260, by adaptively allocating a proportion of 60% of the second step of the compute operation 330 to the geographic location 120 and only 40% of the second step of the compute operation 340 to the geographic location 130, can have balanced the durations of the transfers of the respective portions of the intermediate data sets 222 and 232 to be both approximately twelve seconds in duration, as illustrated in FIG. 2*d*.

As can also be seen by the exemplary system 204 of FIG. 2*d*, by pre-moving some of the initial data, as illustrated by the pre-move data action 270, the latency 250 can be reduced from that obtainable only by adaptively allocating proportions of the second step of the compute operation, as can be seen by comparing FIG. 2b with FIG. 2d.

One mechanism for determining the proportions of tasks to be adaptively allocated among geographic locations can be to solve a linear program directed to minimizing a duration of a transfer of proportions of intermediate data subsets among geographic locations. More specifically, the linear program can select the proportions of a task that each geographic location will perform such that, given the selected proportions, the maximum duration of the transfers of data among the geographic locations is minimized. In mathematical notation, such a linear program can be expressed as follows: min z such that: $\forall i: r_i \geq 0$, $\Sigma_i\ r_i = 1$, $\forall i: T_i^U(r_i) \leq z$ and $\forall i: T_i^D(r_i) \leq z$, where "i" is indicative of a specific geographic location, "$r_i$" is the proportion of a task assigned to that geographic location, "$T_i^U(r_i)$" is the duration of uploading a proportion of a quantity of data from that geographic location and "$T_i^D(r_i)$" is the duration of downloading a proportion of a quantity of data from that geographic location. As indicated previously, the exchange of intermediate data can be considered to have completed only when all of the individual data transfers, comprising such an exchange of intermediate data, have completed. Thus, the above-described linear program seeks to minimize a threshold duration such that all of the relevant transfers are shorter than, or equal to, that threshold duration.

As will be recognized by those skilled in the art, many defined algorithms exist for solving a linear program. For example, the simplex algorithm can be utilized, which can construct a feasible solution at a vertex of a polytope and then attempt different values of control variables to "walk" along a path on the edges of the polytope to vertices with non-decreasing values of the objective function until an optimum is reached. An alternative algorithm can be the criss-cross algorithm that pivots between bases. Still other algorithms for solving linear programs, such as the ellipsoid algorithm, the projective algorithm, and half following algorithms, can likewise be utilized to enable a computing device to efficiently solve the above-described linear program.

According to one aspect, a solution of the above-described linear program, adaptively allocating tasks based on network capabilities so as to minimize a duration of a transfer of intermediate data among multiple geographic locations executing proportions of such tasks in accordance with the adaptive allocation, can be utilized to identify bottlenecks. For example, and with reference back to FIG. 2b, the adaptively allocate tasks action 260 can, such as by using the above-described linear program, have allocated a 75% proportion of the second step of the compute operation to the geographic location 130 and can have allocated a 25% proportion of the second step of the computer operation to the geographic location 120. Such a disproportionate allocation can indicate either that the geographic location receiving the lesser proportion comprises constrained network communication capabilities in so far as receiving data, or can indicate that the geographic location receiving the greater proportion comprises constrained network communication capabilities in so far as transmitting data. Thus, rather than measuring the throughput or transfer durations directly, the adaptive allocation of data according to the above-described linear program enables indirect detection of bottlenecks based on how the tasks were allocated by the resulting solution of the linear program.

Such bottleneck information can then be utilized to pre-move data either to the geographic location comprising the constrained network communication abilities for receiving data, or away from the geographic location comprising the constraint network communication abilities for transmitting data. According to one aspect, pre-movement of data can occur iteratively, such as by initially determining whether pre-moving a portion of the data would result in reduced latency, given an adaptive allocation of tasks that would subsequently occur, and then pre-moving that portion data if the determination reveals that it would result in reduced latency, and then repeating the determining and pre-moving for subsequent portions of the data. Such pre-moving can continue until the query is received. Alternatively, the movement of initial data, such as the exemplary data sets 122 and 132, can occur even after a query is received if the intermediate data generated by the first step of the compute operation is greater than the initial data consumed by such a first step. In such an instance, movement of initial data can avoid movement of a greater quantity of intermediate data at a subsequent point in time. More specifically, since the outputs of the first step of the multi-step compute operation can be generated and stored locally, the distribution of the initial, or input, data can carry over to the intermediate data. As such, moving initial data, even after a query is received, can avoid a subsequent movement of a greater quantity of intermediate data in those instances when the first step of the multi-step compute operation generates a greater quantity of intermediate data as output than the quantity of initial data that it consumed as input.

Figure 3A:
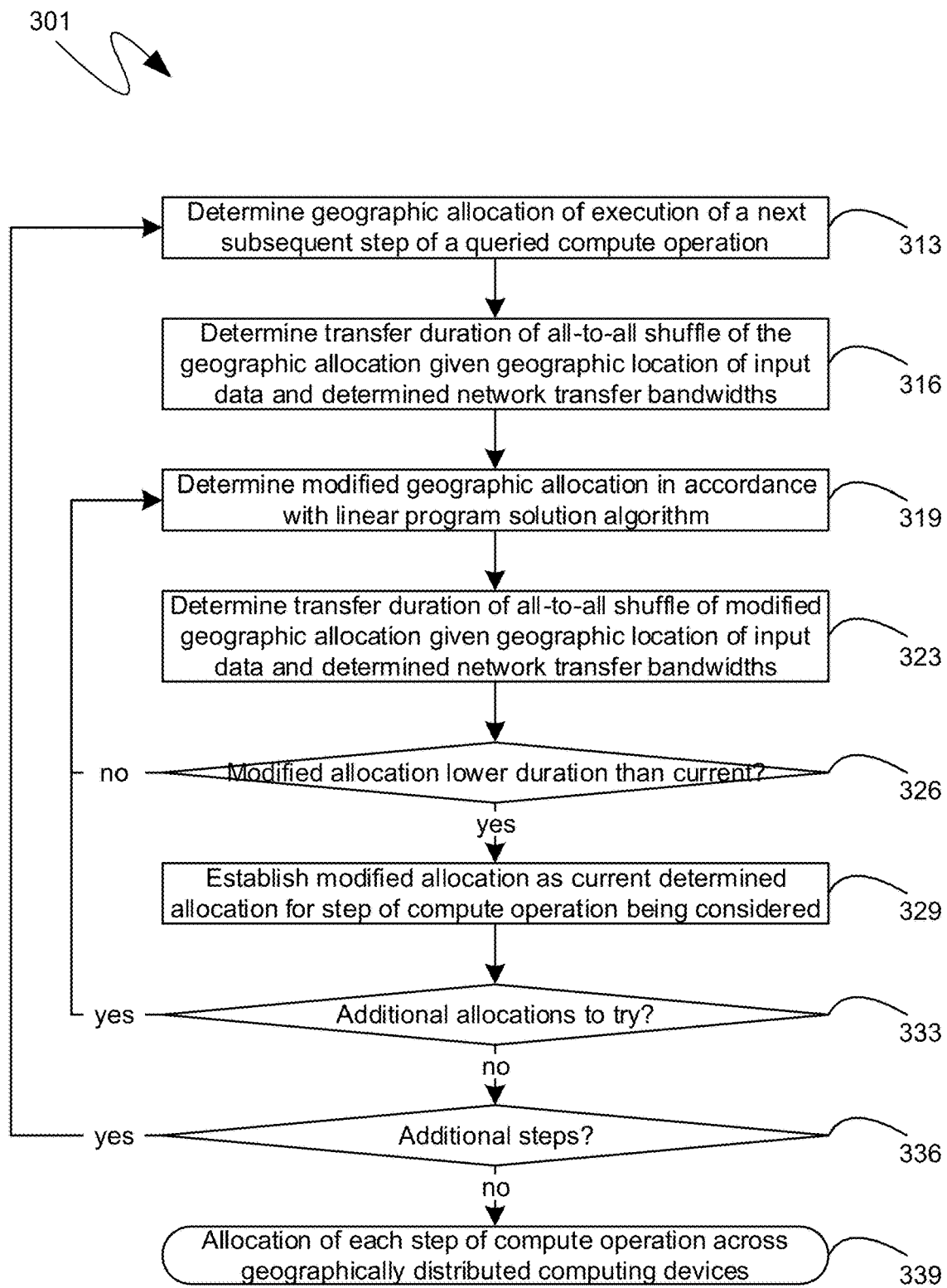
FIGS. 3a through 3c are flow diagrams of exemplary latency reducing mechanisms.

Turning to FIG. 3a, the flow diagram 301 shown therein illustrates an exemplary mechanism for implementing the linear program described above and performing the adaptive allocation of compute operations that was also described above. As indicated, while such an adaptive allocation can be performed on its own, it can also be a subroutine or other like implementation that can be utilized within a greater context of reducing the latency in responding to a query directed to a geographically distributed set of data. Therefore, the exemplary flow diagram 301 does not illustrate preliminary steps, but, instead, commences with the steps directed to adaptively allocating computing operations to minimize the effects of network communication bottlenecks. As will be described in further detail below, exemplary flow diagram 301 can be utilized in the implementation of the latency reduction mechanisms described herein.

The exemplary flow diagram 301 commences with a determination, at step 313, of a current allocation, among the computing devices in different geographic locations, of a subsequent step of a compute operation requested by a query. At step 313, the duration of the transfer of data to implement the execution of the subsequent step, in accordance with the current allocation, can be determined. As illustrated in FIGS. 2a-2d, such a determination can entail determining the quantity of data that will be transmitted between each geographic location and then dividing such a quantity by the throughput of the communication connections between such geographic locations. At step 319 an alternative, modified allocation can be determined, such as in accordance with the algorithms for solving linear programs described above. At step 323 the duration of the exchange of data in accordance with such a modified allocation, from step 319, can be determined.

At step 326 a determination can be made as to whether the modified allocation of step 319 results in a faster, or more efficient, exchange of data than the current allocation of step 313. If, at step 326, it is determined that the allocation of the proportions of the next step of the queried multi-step compute operation, as among the geographically distributed computing devices, that was selected at step 319, does not, in fact, result in reduced transfer times of the intermediate data, then processing can return to step 319 and a different geographic allocation can be selected. Conversely, if, at step 326, it is determined that the allocation, that was selected at step 319, does result in reduced transfer times in the exchange of intermediate data in accordance with such allocation proportions, then, at step 329, the modified allocation of step 319, assigning different proportions of the next step of the multi-step compute operation to different geographic locations, can be established as the current determined allocation for the next step of the multi-step compute operation.

Processing can then proceed to step 333, where a determination can be made as to whether there are different potential allocations to be attempted, such as in accordance with the above-described known algorithmic procedures for solving linear programs. If, at step 333, additional allocations can be attempted, in an effort to find a solution to the above-described linear program, processing can return to step 319. Conversely, if, at step 333, it determined that no additional allocations need to be evaluated, processing can proceed to step 336.

Although the mechanisms described have been illustrated within the context of a two-step compute operation, such as the well-known Map Reduce compute operation, they are equally applicable to compute operations having three or more steps, including compute operations where multiple steps are performed in parallel, or where multiple separate steps each individually output data that is utilized as the input to a single subsequent step. In such instances, the adaptive allocation of computer operations, such as that detailed herein, can be performed first on a top level stage, or step, of the multi-step compute operation, an allocation can be established for such a step, and then the process can be repeated for a next subsequent step. Thus, as illustrated by the exemplary flow diagram 301 of FIG. 3a, at step 336, a determination can be made as to whether the multi-step compute operation comprises additional steps beyond the steps for which an allocation was determined by the preceding steps of the exemplary flow diagram 301. If, at step 336, there are no such additional steps, then, at step 339, the exemplary flow diagram 301 can conclude with a determined allocation of the proportions of a subsequent step of a multi-step computer operation that are to be executed by the computing devices at each respective geographic location. Conversely, if, at step 336, there are additional steps in the multi-step compute operation, then processing can return to step 313, and a current geographic allocation for the execution of a next subsequent step of the multi-step compute operation can be determined, and the processing can proceed from there, as described, for such a next subsequent step.

Figure 3B:
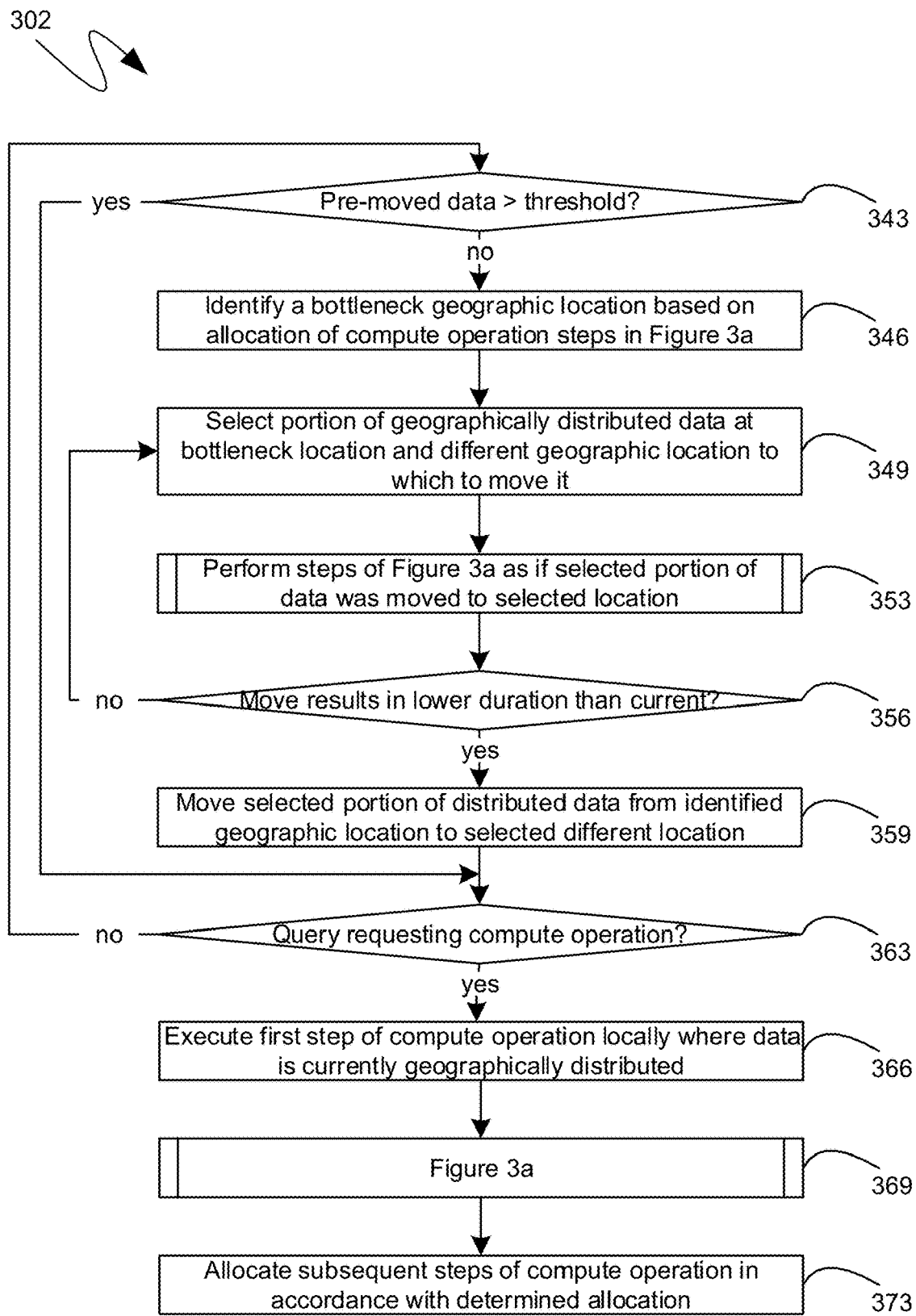

As indicated previously, the mechanisms for determining an allocation of proportions of compute operations among geographically distributed computing devices can be utilized to identify bottlenecks and aid other aspects of the latency reduction mechanisms described herein including, for example, the pre-moving of data, such as that described in detail above. Turning to FIG. 3b, therefore, the exemplary flow diagram 302 illustrates an exemplary utilization of the steps of the flow diagram 301 of FIG. 3a to aid in the pre-moving of data to result in greater latency reductions.

Initially, as illustrated by step 343, a determination can be made as to whether a quantity of pre-moved data exceeds a threshold. More specifically, since, in one aspect, a "what if" approach can be utilized to identify data to pre-move, and then pre-move such data, until a query is received, if there is a sufficient lag until the query is received, data may be continually pre-moved even though, after a certain point, the pre-movement of further data results in only minimal decreases in the ultimate latency. To avoid wasting computer network resources by continuing to move data despite only de minimus benefits for doing so, according to one aspect a threshold quantity of data can be established such that, once such a threshold is reached, no further data pre-moving is performed. Such a threshold can be expressed as an absolute figure, or can be expressed as a multiplier of a minimal amount of data that could be moved and still enable a response to the query. For example, utilizing known data transmission minimization schemes, a determination can be made as to a minimum quantity of data that would be transmitted, through network communications between the geographically distributed computing devices, that would still provide for a response to the query. A threshold, such as that of step 343, can then be established as a multiplier of such a minimum amount of data. Such a multiplier could be, for example, 1.2, 1.3, 1.4, any multiplier between 1.1 and 1.5, any multiplier between 1.01 and 2.01, and so on. If, at step 343, it is determined that the quantity of pre-moved data has already exceeded such a threshold, then processing can skip directly to step 363, described in further detail below.

Conversely, if, at step 343, it is determined that the quantity of data that has already been pre-moved is not greater than a threshold, then processing can proceed with step 346, wherein the steps of FIG. 3a can be utilized to identify a bottleneck geographic location. More specifically, and as detailed previously, if the performance of the steps of FIG. 3a results in a disproportional allocation of a subsequent step of the multi-step compute operation, then a determination can be made, at step 346, that either a geographic location receiving a disproportionately large allocation of such a subsequent step has a bottleneck in the transmission of data, or a geographic location receiving a disproportionately small allocation of such a subsequent step has a bottleneck in the receipt of data. Accordingly, at step 349, a portion of the geographically distributed data that would serve as the initial input to the multi-step compute operation, and to which the query was directed, can be pre-moved so as to further the goals of the adaptive allocation in reducing latency. For example, a portion of the geographically distributed data can be selected, from one geographic location, to be pre-moved to the geographic location that was assigned a disproportionately small allocation of the performance of a subsequent step. Upon selecting such a portion of the geographically distributed data, and a destination geographic location, at step 349, processing can proceed to step 353, where the steps of the flow diagram 301 of FIG. 3a can be performed. Additionally, the latency reduction anticipated by the pre-move of step 349, and the resulting modified allocation determined at step 353 by the performance of the steps of the flow diagram 301 a FIG. 3a, can be determined. At step 356, such an anticipated latency reduction can be compared to a currently expected latency reduction if no pre-move was made.

If, at step 356, is determined that the pre-move selected at step 349 does result in a further latency reduction, then, processing can proceed to step 359 and such a pre-move can be performed by the relevant computing devices at the geographic locations selected as part of step 349. Conversely, if, at step 356, is determined that the pre-move selected at step 349 does not result in a further latency reduction, processing can return to step 349 to attempt a different pre-move, which can then be evaluated at step 353, as detailed. Once data is pre-moved at step 359, processing can proceed to step 363 where a determination can be made as to whether the anticipated query has been received. If, at step 363, the query has not yet been received, processing can return the step 343. Colloquially, steps 343 through 363 can be performed until either the query is received or a threshold quantity of data is pre-moved.

Once the query is received, such as determined at step 363, processing can proceed to step 366, and the first step of the multi-step compute operation requested by the query can be executed on locally available data at each of the geographically distributed computing devices having access to local portions of the geographically distributed data. During the processing of such a first step, of the multi-step compute operation requested by the query that was received at step 363, the performance of the steps of the flow diagram 301 of FIG. 3*a* can be executed at step 369 to identify an allocation of compute operations for a subsequent step of the multi-step compute operation. Such an allocation can then be implemented at step 373.

While the mechanisms have, thus far, been described within the context of a single data set and a single query directed to such a data set, they are equally applicable to geographically distributed computing systems comprising multiple data sets and multiple queries directed to such data sets. To determine which data set should benefit from the above described latency reduction mechanisms first, a ranking mechanism can be implemented to identify important data sets, and such data sets can have the above-described mechanisms applied to them first. A determination of an importance of the data set can be based on factors including an amount of lag time between when such a data set was created, or stored, and when a query directed to such a data set will be received. By way of an example, data sets expected to receive a query very soon can receive a higher score, and higher priority, than data sets to which a query will not be directed until a later time. Another factor on which a determination of the importance of a data set can be based can be the expected reduction in latency. Thus, for example, data sets having queries directed thereto that can receive the greatest reduction in latency, either as a percentage, or as an quantitative amount, can be deemed to be higher importance data sets, or can be assigned a higher score, then those data sets having queries directed thereto that would receive only small reductions in latency. A still further factor on which a determination of an importance of a data set can be based can be a quantity of data that would needed to be pre-moved in order to achieve the anticipated latency reductions available through utilization of the above-described mechanisms. More specifically, data sets having queries directed thereto that can receive latency reduction benefits while moving only a small amount of data can be deemed to have a higher score than those data sets whose queries would require a large quantity of data to be moved in order to achieve latency reduction benefits. A yet further factor on which a determination of an importance of a data set can be based can be an anticipated reduction in an aggregate quantity of data that would be exchanged in the performance of the compute operations requested by the query. According to one aspect, a score assigned to a data set can be a combination of two or more of the above described factors.

Figure 3C:
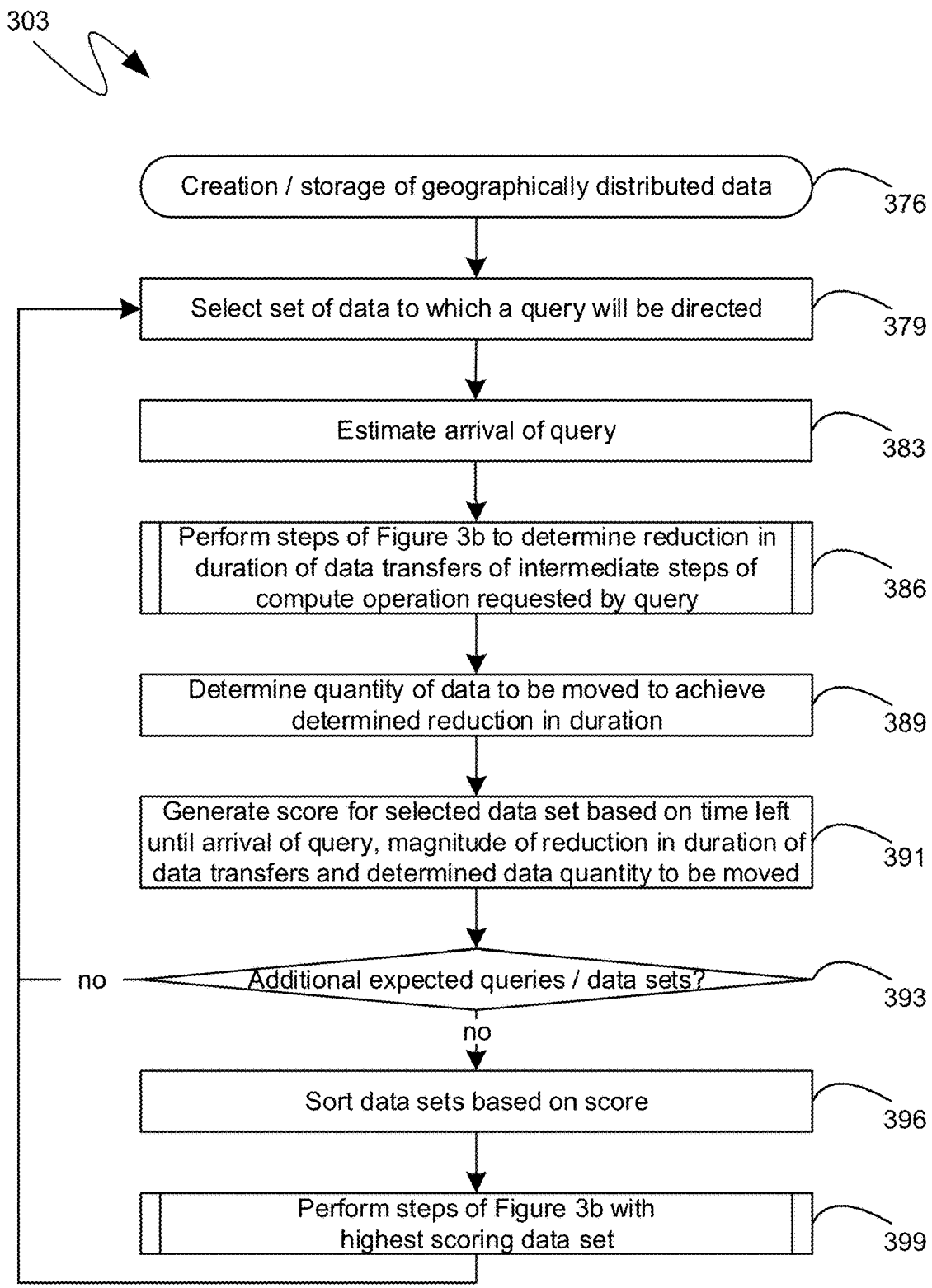

Turning to FIG. 3*c*, therefore, the exemplary flow diagram 303 illustrates an exemplary series of steps that can be performed by geographically distributed computing systems in order to obtain latency reduction benefits for queries directed to geographically distributed sets of data. Initially, at step 376, the creation or storage of the geographically distributed set of data, to which a subsequent query will be directed, can complete. Subsequently, at step 379, a set of geographically distributed data to which a subsequent query is expected to be directed, can be selected for evaluation. At step 383, the arrival of the query can be estimated such as, for example, based on prior queries establishing a pattern, periodicity, or other like historical information that can be utilized to predict or anticipate the arrival of a subsequent query, as detailed above.

As part of the evaluation of the set of geographically distributed data that was selected at step 379, processing can perform the steps of the flow diagram 302 of FIG. 3*b* at step 386 in order to determine an anticipated reduction in latency. As indicated previously, such an anticipated reduction in latency primarily derives from an anticipated reduction in the duration of data transfers that are part of intermediate steps of the multi-step compute operation that will be requested by the query in which will operate on the geographically distributed set of data selected at step 379. At step 389, a quantity of data that would be moved, in order to achieve the anticipated latency reduction determined by step 386, can be determined. Utilizing factors, such as those detailed above and determined by steps 383 through 389, a score for the geographically distributed set of data that was selected at step 379 can be generated at step 391. At step 393 determination can be made as to whether additional data sets and queries are to be evaluated. If, at step 393, additional such data sets and queries remain, then processing can return to step 379 and the steps 379 through 393 can be performed again for such subsequent sets of data. Once the scoring of the sets of data is complete, processing can proceed to step 396 and the data sets can be sorted based on their score. At step 399, the steps of the flow diagram 302 of FIG. 3*b* can be performed to reduce the latency in responding to an anticipated query directed to the highest scoring data set. The processing can then return to step 379 and can be repeated accordingly for other data sets.

Additional latency reducing mechanisms can be utilized in conjunction with the above-described mechanisms to further reduce the latency in providing responses to queries directed to geographically distributed sets of data. For example, multiple tasks of a multi-task compute operation could be scheduled in groups to avoid introducing latency between when one task finishes and a second, subsequent task commences. Such a mechanism can be useful in situations where a subsequent task is only scheduled upon receipt of a completion notification of a preceding task and the transmission of the completion notification and subsequent transmission of the scheduling of the subsequent task introduce communication delays. As another example, subsequent tasks, of a multi-task compute operation can be scheduled before the preceding tasks, generating outputs that will be used as inputs to those subsequent tasks, finish. A still further example can be to reuse containers to minimize setup and other incidental processing.

While the above-described mechanisms have, in specific instances, been described on a per-step basis, they are not so limited. For example, the determination, at step 326 of the flow diagram 301 of FIG. 3*a*, as to whether a modified allocation results in an intermediate data exchange of shorter duration can take into account, not only the duration of the intermediate data exchange of the immediately subsequent step, but can also take into account potential changes to the duration of the data exchange of downstream steps beyond the immediately subsequent step. For example, the determination, at step 326, and the subsequent action at step 329 can select modified allocations that lower an aggregate duration of multiple intermediate data exchanges for multiple intermediate steps.

Figure 4:
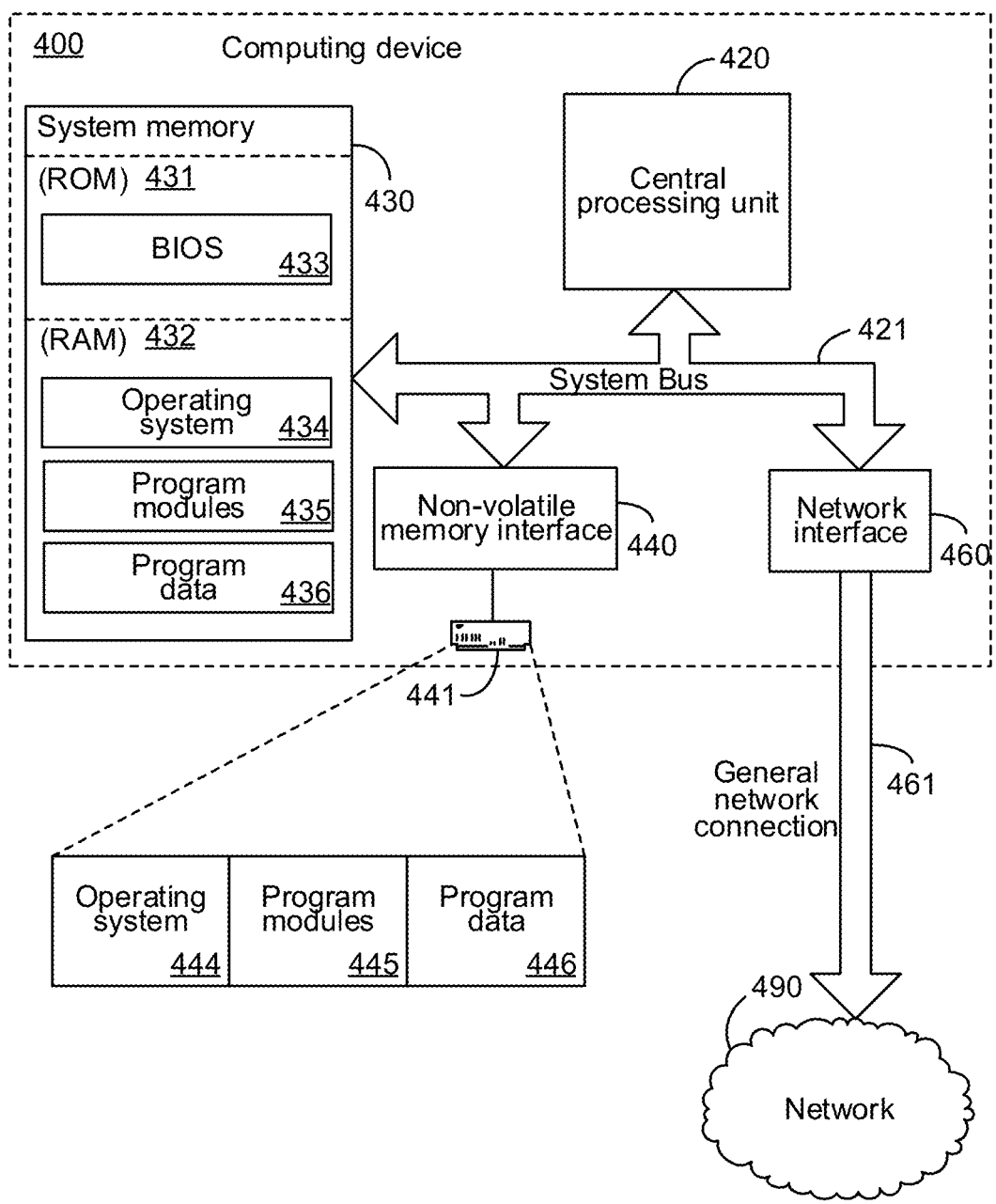
FIG. 4 is a block diagram of an exemplary computing device.

Turning to FIG. 4, an exemplary computing device 400 is illustrated which can perform some or all of the mechanisms and actions described above. The exemplary computing device 400 can include, but is not limited to, one or more central processing units (CPUs) 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. Depending on the specific physical implementation, one or more of the CPUs 420, the system memory 430 and other components of the computing device 400 can be physically co-located, such as on a single chip. In such a case, some or all of the system bus 421 can be nothing more than silicon pathways within a single chip structure and its illustration in FIG. 4 can be nothing more than notational convenience for the purpose of illustration.

The computing device 400 also typically includes computer readable media, which can include any available media that can be accessed by computing device 400 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 400. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer content between elements within computing device 400, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, other program modules 435, and program data 436.

The computing device 400 may also include other removable/non-removable, volatile/nonvolatile computer storage media. By way of example only, FIG. 4 illustrates a hard disk drive 441 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 441 is typically connected to the system bus 421 through a non-volatile memory interface such as interface 440.

The drives and their associated computer storage media discussed above and illustrated in FIG. 4, provide storage of computer readable instructions, data structures, program modules and other data for the computing device 400. In FIG. 4, for example, hard disk drive 441 is illustrated as storing operating system 444, other program modules 445, and program data 446. Note that these components can either be the same as or different from operating system 434, other program modules 435 and program data 436. Operating system 444, other program modules 445 and program data 446 are given different numbers hereto illustrate that, at a minimum, they are different copies.

The computing device 400 may operate in a networked environment using logical connections to one or more remote computers. The computing device 400 is illustrated as being connected to the general network connection 461 through a network interface or adapter 460, which is, in turn, connected to the system bus 421. In a networked environment, program modules depicted relative to the computing device 400, or portions or peripherals thereof, may be stored in the memory of one or more other computing devices that are communicatively coupled to the computing device 400 through the general network connection 461. It will be appreciated that the network connections shown are exemplary and other means of establishing a communications link between computing devices may be used.

Although described as a single physical device, the exemplary computing device 400 can be a virtual computing device, in which case the functionality of the above-described physical components, such as the CPU 420, the system memory 430, the network interface 460, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 400 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example, a method of reducing latency of a multi-step compute operation that is performed by geographically distributed computing devices on a set of geographically distributed data, the method comprising the steps of: identifying a first bottleneck geographic location comprising at least one of constrained data download capabilities or constrained data upload capabilities, the first bottleneck geographic location comprising some of a first set of geographically distributed data to which a first query will be directed; determining whether moving a portion of the first set of geographically distributed data either to or from the identified first bottleneck geographic location will reduce a duration of a subsequent data exchange of geographically distributed data among the geographically distributed computing devices to execute a subsequent step of a first multi-step compute operation that will be requested by the first query; initiating, prior to receipt of the first query, the moving of the portion of the first set of geographically distributed data if the moving will reduce the duration of the subsequent exchange of data; initiating execution of an initial step of the first multi-step compute operation in response to the receipt of the first query, the initial step being executed by the geographically distributed computing devices on local portions of the geographically distributed first set of data as moved by the moving; determining whether an allocation, of either an increased or a decreased portion of the subsequent step, to the identified first bottleneck geographic location will reduce the duration of the subsequent data exchange of geographically distributed data among the geographically distributed computing devices; and allocating among the geographically distributed computing devices, portions of the subsequent step of the first multi-step compute operation in accordance with the allocation if the allocation will reduce the duration of the subsequent exchange of data.

A second example is the method of the first example, wherein the identifying the first bottleneck geographic location comprises performing the determining whether the allocation will reduce the duration of the subsequent data exchange of geographically distributed data.

A third example is the method of the first example, wherein the determining whether the moving the portion of the first set of geographically distributed data will reduce the duration of the subsequent data exchange of geographically distributed data comprises: determining, assuming the moving was performed, an allocation of the subsequent step among the geographically distributed computing devices that further reduces the duration of the subsequent data exchange of geographically distributed data.

A fourth example is the method of the first example, wherein the initiating the moving of the portion of the first set of geographically distributed data is not performed if an aggregate amount of data previously moved, of the first set of geographically distributed data, is greater than a predetermined threshold.

A fifth example is the method of the first example, further comprising repeating: the identifying the first bottleneck, the determining whether the moving will reduce the duration of the subsequent data exchange of geographically distributed data, and the initiating the moving until the receipt of the first query.

A sixth example is the method of the first example, further comprising: determining an optimal allocation of portions of the subsequent step by iteratively repeating the determining whether the allocation of the portion of the subsequent step to the identified first bottleneck geographic location will reduce the duration of the subsequent data exchange of geographically distributed data.

A seventh example is the method of the first example, wherein the identifying the first bottleneck, the determining whether the moving will reduce the duration of the subsequent data exchange of geographically distributed data, and the initiating the moving are performed even after the receipt of the first query if a quantity of intermediate data generated by a first step of multi-step compute operation is greater than a quantity of the geographically distributed data processed by the first step.

An eighth example is the method of the first example, further comprising: determining allocations for still further subsequent steps of the first multi-step compute operation requested by the first query that reduce a duration of still further subsequent data exchanges of geographically distributed data among the geographically distributed computing devices.

A ninth example is the method of the first example, further comprising: assigning a first value to the first set of geographically distributed data proportionally to a quantity of an anticipated reduction in the duration of the subsequent data exchange of geographically distributed data; assigning a second value to a second set of geographically distributed data proportionally to a quantity of an anticipated reduction in the duration of a subsequent data exchange of geographically distributed data to execute a subsequent step of a second multi-step compute operation that will be requested by the second query directed to the second set of geographically distributed data; and performing the steps of claim 1 if the first value is greater than the second value.

A tenth example is the method of the first example further comprising: predicting when the first query will be received based on prior queries.

An eleventh example is the method of the tenth example, further comprising: assigning a first value to the first set of geographically distributed data inversely proportionally to a first lag between a current time and a predicted time when the first query will be received; assigning a second value to a second set of geographically distributed data inversely proportionally to a second lag between a current time and a predicted time when a second query, directed to the second set of geographically distributed data, will be received; and performing the steps of claim 1 if the first value is greater than the second value.

A twelfth example is a computing device comprising: one or more processing units; a first set of one or more computer-readable media having stored thereon an initial portion of a set of geographically distributed data to which a query will be directed; and a second set of one or more computer-readable media comprising computer-executable instructions, which, when executed by the one or more processing units, cause the computing device to: move, prior to receipt of the query, at least some of the initial portion of the set of geographically distributed data to a different computing device if the computing device either has constrained data upload capabilities or if the different computing device has constrained data download capabilities; execute a first step of a multi-step compute operation requested by the query on the remaining portion of the set of geographically distributed data to which the query was directed, the executing generating intermediate data; store the intermediate data on the first set of computer-readable media; and execute an assigned proportion of a subsequent step of the multi-step compute operation requiring obtaining of the assigned proportion of other intermediate data from other computing devices; wherein the assigned proportion is such that a duration of the obtaining of the assigned proportion of other intermediate data from other computing devices is balanced with a duration of a providing of a remaining proportion of the intermediate data stored on the first set of computer-readable media.

A thirteenth example is a system comprising: a first computing device in a first geographic location, the first computing device having locally accessible to it a first portion of a set of geographically distributed data; a second computing device in a second geographic location, the second computing device having locally accessible to it a second portion of the set of geographically distributed data; a communicational connection between the first and second computing devices allowing data to be provided from the first computing device to the second computing device faster than data can be provided from the second computing device to the first computing device; and one or more computer-readable media comprising computer-executable instructions, which, when executed, cause a computing device to: determine to move some of the second portion of the set of geographically distributed data from the second computing device to the first computing device based on the communicational connection enabling data to be provided from the first to the second computing device faster than data can be provided from the second to the first computing device; instruct the first and second computing devices to move the some of the second portion of the set of geographically distributed data from the second computing device to the first computing device prior to receipt of a query directed to the set of geographically distributed data; instruct, in response to receiving the query, the first computing device to execute a first step of a multi-step compute operation requested by the query on the first portion of the set of geographically distributed data and on the some of the second portion of the set of geographically distributed data that was moved from the second computing device to the first computing device, the first computing device generating a first portion of intermediate data by executing the first step; instruct, in response to receiving the query, the second computing device to execute a second step of the multi-step compute operation requested by the query on the remaining second portion of the set of geographically distributed data, remaining after the some of the second portion of the set of geographically distributed data that was moved from the second computing device to the first computing device, the second computing device generating a second portion of intermediate data by the executing the first step; determine an allocation of a subsequent step of the multi-step compute operation as among the first and second computing devices, the determined allocation comprising a first proportion of the subsequent step allocated to be performed by the first computing device and a second proportion of the subsequent step allocated to be performed by the second computing device; and allocate performance of the subsequent step of the multi-step compute operation among the first and second computing devices in accordance with the determined allocation; wherein the determining the allocation of the subsequent step is performed by balancing a duration to transmit the first proportion of the second portion of intermediate data from the second computing device to the first computing device with a duration to transmit the second proportion of the first portion of intermediate data from the first computing device to the second computing device.

A fourteenth example is the system of the thirteenth example, wherein the computer-executable instructions causing the computing device to instruct the first and second computing devices to move some of the second portion of the set of geographically distributed data are not executed if an aggregate amount of data previously moved, of the set of geographically distributed data, is greater than a predetermined threshold.

A fifteenth example is the system of the thirteenth example, wherein the computer-executable instructions causing the computing device to determine to move some of the second portion of the set of geographically distributed data and to instruct the first and second computing devices to move the some of the second portion of the set of geographically distributed data are repeatedly executed until the query is received.

A sixteenth example is the system of the thirteenth example, wherein the computer-executable instructions causing the computing device to determine to move some of the second portion of the set of geographically distributed data and to instruct the first and second computing devices to move the some of the second portion of the set of geographically distributed data are executed even after the receipt of the query if a quantity of the intermediate data generated by the first step of the multi-step compute operation is greater than a quantity of the geographically distributed data processed by the first step.

A seventeenth example is the system of the thirteenth example, wherein the one or more computer-readable media comprise further computer-executable instructions, which, when executed, cause the computing device to: determine allocations for still further subsequent steps of the multi-step compute operation requested by the query that balance a duration of exchanges of still further intermediate data between the first and second computing devices.

An eighteenth example is the system of the thirteenth example, wherein: the first computing device has, locally accessible to it, a first portion of a second set of geographically distributed data; the second computing device also, locally accessible to it, a second portion of the second set of geographically distributed data; and the one or more computer-readable media comprise further computer-executable instructions, which, when executed, cause the computing device to: assign a first value to the set of geographically distributed data proportionally to a quantity of an anticipated reduction in a duration of the exchange of the first and second portions of intermediate data; assigning a second value to the second set of geographically distributed data proportionally to a quantity of an anticipated reduction in a duration of a duration of an exchange of first and second portions of intermediate data that would be generated by the first and second computing devices executing a first step of a second multi-step compute operation on at least some of the second set of geographically distributed data; and executing the computer-executable instructions if the first value is greater than the second value.

A nineteenth example is the system of the thirteenth example, wherein the one or more computer-readable media comprise further computer-executable instructions, which, when executed, cause the computing device to: predict when the query will be received based on prior queries.

A twentieth example is the system of the nineteenth example, wherein: the first computing device has, locally accessible to it, a first portion of a second set of geographically distributed data; the second computing device also, locally accessible to it, a second portion of the second set of geographically distributed data; and the one or more computer-readable media comprise further computer-executable instructions, which, when executed, cause the computing device to: assign a first value to the set of geographically distributed data inversely proportionally to a first lag between a current time and a predicted time when the query will be received; assign a second value to the second set of geographically distributed data inversely proportionally to a second lag between a current time and a predicted time when a second query, directed to the second set of geographically distributed data, will be received; and execute the computer-executable instructions if the first value is greater than the second value.

As can be seen from the above descriptions, mechanisms decreasing latency through pre-moving of geographically distributed data and adaptively allocating compute operations among geographically distributed computing devices have been presented. In view of the many possible variations of the subject matter described herein, we claim as our invention all such embodiments as may come within the scope of the following claims and equivalents thereto.

We claim:

1. A system comprising:
   a first computing device;
   a second computing device; and
   one or more computer-readable storage media comprising computer-executable instructions, which, when executed:
      predict: (1) a first duration for the first computing device to receive, from the second computing device a first share of a first data in accordance with an initial allocation of a first compute operation distributed among the first and second computing devices and (2) a second duration for the second computing device to receive, from the first computing device a second share of the first data in accordance with the initial allocation of the first compute operation; and
      change, prior to performing the first compute operation, the initial allocation of the first compute operation among the first and second computing devices into a subsequent allocation of the first compute operation among the first and second computing devices by reducing a share of the first compute operation performed by the first computing device based on the predicting determining that the first duration is greater than the second duration;
   wherein the first compute operation transforms the first input data into a first output data;
   wherein the first compute operation is a step of a multi-step compute operation;
   wherein the first input data is a second output data that is generated by a second compute operation, the second compute operation being an immediately prior step in the multi-step compute operation that is immediately prior to the first compute operation;
   wherein a distribution of the second output data among the first and second computing devices differs from a distribution of the first input data among the first and second computing devices that is required by the both the initial allocation, and the subsequent allocation, of the first compute operation among the first and second computing devices; and
   wherein the first and second computing devices transmit portions of the second output data to each other to transform the distribution of the second output data among the first and second computing devices into the distribution of the first input data among the first and second computing devices that is required by the subsequent allocation of the first compute operation among the first and second computing devices.

2. The system of claim 1, wherein the computer-executable instructions for predicting comprise computer-executable instructions, which, when executed divide a quantity of data to be transmitted from the second computing device to the first computing device by a first throughput of a first communicational connection between the first and second computing devices.

3. The system of claim 1, wherein the first duration is greater than the other duration because the first computing device has slower download throughput than the second computing device.

4. The system of claim 1, wherein the first duration is greater than the second duration because the second computing device has slower upload throughput than the first computing device.

5. The system of claim 1, wherein the changing the initial allocation into the subsequent allocation is contingent upon an aggregate amount of data previously moved during performance of the multi-step compute operation being less than a predetermined threshold.

6. The system of claim 1, wherein the one or more computer-readable storage media comprise further computer-executable instructions, which, when executed:
   change, prior to performing a second compute operation, an initial distribution of a second input data among the multiple computing devices into a subsequent distribution of the second input data among the multiple computing devices by increasing a share of the second input data received by the first computing device based on the predicting determining that the first duration is greater than the other durations; and
   repeat the predicting and the changing the initial allocation of the first compute operation into the subsequent allocation of the first compute operation utilizing the distribution of the second output data resulting from the changing the initial distribution of the second input data into the subsequent distribution of the second input data;
   wherein the second compute operation transforms the second input data into the second output data.

7. The system of claim 6, wherein the further computer-executable instructions are iteratively executed to reduce the predicted durations.

8. The system of claim 6, wherein the computer-executable instructions for changing the initial distribution of the second input data into the subsequent distribution of the second input data are executed prior to receipt of a query that triggers performance of the multi-step compute operation.

9. The system of claim 6, wherein the computer-executable instructions for changing the initial distribution of the second input data into the subsequent distribution of the second input data are executed even if it will delay commencing the second compute operation.

10. The system of claim 9, wherein the computer-executable instructions for changing the initial distribution of the second input data into the subsequent distribution of the second input data are executed contingent upon the second output data being greater than the second input data.

11. A method of reducing computational latency comprising:
   predicting durations for multiple computing devices to each receive, from others of the multiple computing devices, shares of a first data in accordance with an initial allocation of a first compute operation distributed among the multiple computing devices; and
   changing, prior to performing the first compute operation, the initial allocation of the first compute operation among multiple computing devices into a subsequent allocation of the first compute operation among the multiple computing devices by reducing a share of the first compute operation performed by a first computing device, of the multiple computing devices, based on the predicting determining that a first duration, for the first computing device to receive a first portion of the first input data from the others of the multiple computing devices, is greater than other durations for the others of the multiple computing devices to receive portions of the first input data allocated to the others of the multiple computing devices;

wherein the first compute operation transforms the first input data into a first output data;

wherein the first compute operation is a step of a multi-step compute operation;

wherein the first input data is a second output data that is generated by a second compute operation, the second compute operation being an immediately prior step in the multi-step compute operation that is immediately prior to the first compute operation;

wherein a distribution of the second output data among the multiple computing devices differs from a distribution of the first input data among the multiple computing devices that is required by the both the initial allocation, and the subsequent allocation, of the first compute operation among the multiple computing devices; and wherein one or more of the multiple computing devices transmit portions of the second output data to one or more others of the multiple computing devices to transform the distribution of the second output data among the multiple computing devices into the distribution of the first input data among the multiple computing devices that is required by the subsequent allocation of the first compute operation among the multiple computing devices.

12. The method of claim 11, wherein the predicting comprises dividing a quantity of data to be transmitted from a second computing device to the first computing device by a first throughput of a first communicational connection between the first and second computing devices.

13. The method of claim 11, wherein the first duration is greater than the other durations because the first computing device has slower download throughput than at least some of the others of the multiple computing devices.

14. The method of claim 11, wherein the first duration is greater than the other durations because a second computing device has slower upload throughput than at least some of the others of the multiple computing devices;

wherein the first computing device receives at least a subset of the first portion of the first input data from the second computing device.

15. The method of claim 11, wherein the changing the initial allocation into the subsequent allocation is contingent upon an aggregate amount of data previously moved during performance of the multi-step compute operation being less than a predetermined threshold.

16. The method of claim 11, further comprising:

changing, prior to performing a second compute operation, an initial distribution of a second input data among the multiple computing devices into a subsequent distribution of the second input data among the multiple computing devices by increasing a share of the second input data received by the first computing device based on the predicting determining that the first duration is greater than the other durations; and repeating the predicting and the changing the initial allocation of the first compute operation into the subsequent allocation of the first compute operation utilizing the distribution of the second output data resulting from the changing the initial distribution of the second input data into the subsequent distribution of the second input data;

wherein the second compute operation transforms the second input data into the second output data.

17. The method of claim 16, wherein the changing the initial distribution of the second input data into the subsequent distribution of the second input data is performed prior to receipt of a query that triggers performance of the multi-step compute operation.

18. The method of claim 16, wherein the changing the initial distribution of the second input data into the subsequent distribution of the second input data is performed even if it will delay commencing the second compute operation.

19. The method of claim 9, wherein the changing the initial distribution of the second input data is contingent upon the second output data being greater than the second input data.

20. One or more computer storage media comprising computer-executable instructions, which, when executed:

predict durations for multiple computing devices to each receive, from others of the multiple computing devices, shares of a first data in accordance with an initial allocation of a first compute operation distributed among the multiple computing devices; and change, prior to performing the first compute operation, the initial allocation of the first compute operation among multiple computing devices into a subsequent allocation of the first compute operation among the multiple computing devices by reducing a share of the first compute operation performed by a first computing device, of the multiple computing devices, based on the predicting determining that a first duration, for the first computing device to receive a first portion of the first input data from the others of the multiple computing devices, is greater than other durations for the others of the multiple computing devices to receive portions of the first input data allocated to the others of the multiple computing devices;

wherein the first compute operation transforms the first input data into a first output data;

wherein the first compute operation is a step of a multi-step compute operation;

wherein the first input data is a second output data that is generated by a second compute operation, the second compute operation being an immediately prior step in the multi-step compute operation that is immediately prior to the first compute operation;

wherein a distribution of the second output data among the multiple computing devices differs from a distribution of the first input data among the multiple computing devices that is required by the both the initial allocation, and the subsequent allocation, of the first compute operation among the multiple computing devices; and wherein one or more of the multiple computing devices transmit portions of the second output data to one or more others of the multiple computing devices to transform the distribution of the second output data among the multiple computing devices into the distribution of the first input data among the multiple computing devices that is required by the subsequent allocation of the first compute operation among the multiple computing devices.

* * * * *